(12) United States Patent
Wang et al.

(10) Patent No.: US 9,030,442 B2
(45) Date of Patent: May 12, 2015

(54) TOUCH PANEL AND METHOD FOR MANUFACTURING THE SAME

(71) Applicant: Eturbotouch Technology Inc., Zhongli (TW)

(72) Inventors: Kuei-Ching Wang, Longtan Township (TW); Ta-Hu Lin, Taipei (TW)

(73) Assignee: Eturbotouch Technology Inc. (TW)

( * ) Notice: Subject to any disclaimer, the term of this patent is extended or adjusted under 35 U.S.C. 154(b) by 66 days.

(21) Appl. No.: 14/072,869

(22) Filed: Nov. 6, 2013

(65) Prior Publication Data

US 2014/0354903 A1 Dec. 4, 2014

(30) Foreign Application Priority Data

May 31, 2013 (TW) .............................. 102119347 A

(51) Int. Cl.
*G06F 3/045* (2006.01)
*G06F 3/041* (2006.01)

(52) U.S. Cl.
CPC ...................................... *G06F 3/041* (2013.01)

(58) Field of Classification Search
None
See application file for complete search history.

(56) References Cited

U.S. PATENT DOCUMENTS

2012/0092292 A1* 4/2012 Hayakawa ..................... 345/174
2013/0038543 A1* 2/2013 Su ................................. 345/173

* cited by examiner

*Primary Examiner* — Nicholas Lee
(74) *Attorney, Agent, or Firm* — Schmeiser, Olsen & Watts, LLP

(57) ABSTRACT

A touch panel and a method for manufacturing the same are introduced and characterized by enhanced process yield of the touch panel. The manufacturing method includes stacking a first conductive layer on a substrate, stacking an electrode on the first conductive layer, stacking a first insulating transparent layer on the electrode and the first conductive layer, exposing the electrode from the first insulating transparent layer by exposure and development, stacking a second insulating transparent layer on the electrode, the first conductive layer, and the first insulating transparent layer, stacking a second conductive layer on the second insulating transparent layer, stacking a metal layer on the electrode and the substrate to form a first transmission line, and stacking the metal layer on at least a portion of the second conductive layer and the substrate to form a second transmission line.

12 Claims, 7 Drawing Sheets

A-A'

B-B'

TOUCH PANEL AND METHOD FOR MANUFACTURING THE SAME

CROSS-REFERENCE TO RELATED APPLICATION

This non-provisional application claims priority under 35 U.S.C. §119(a) on Patent Application No(s). 102119347 filed in Taiwan, R.O.C. on May 31, 2013, the entire contents of which are hereby incorporated by reference.

FIELD OF TECHNOLOGY

The present invention relates to touch panels, and more particularly, to a touch panel and a method for manufacturing the same, which feature high process yield.

BACKGROUND

Due to the increasingly wide use of touch panels, a conventional touch panel essentially comes in various types, namely a resistive touch panel, a capacitive touch panel, an infrared touch panel, and a sound wave touch panel.

According to the prior art, a conventional touch panel which comprises a plurality of conductive layers, a dielectric layer, and a metal layer and can be manufactured by multiple processes, namely exposure, development, etching, and sputtering. However, if one of the aforesaid processes goes wrong, the touch panel will get damaged. As a result, the prior art is flawed with low process yield of touch panels.

Accordingly, it is imperative to enhance the process yield of touch panels.

SUMMARY

The first objective of the present invention is to provide a touch panel which comprises a first conductive layer, an electrode, and a metal layer, wherein the electrode is stacked on the first conductive layer in advance to allow the first conductive layer to be easily connected to the metal layer by means of the electrode.

The second objective of the present invention is to provide a touch panel which further comprises a first insulating transparent layer, a second insulating transparent layer and a second conductive layer. After exposure, development, and/or etching have been performed on the first conductive layer, the first insulating transparent layer, the second conductive layer, and the second insulating transparent layer, a portion of the first insulating transparent layer and a portion of the second insulating transparent layer are kept so as to separate the first conductive layer and the second conductive layer.

The third objective of the present invention is to provide a touch panel characterized in that the electrode is made of a material resistant to developers and/or etching solutions, such that the electrode is not affected by the developers and/or etching solutions during the development and etching process performed on the insulating transparent layer and the conductive layer.

The fourth objective of the present invention is to provide a touch panel manufacturing method conducive to enhancement of the process yield of the touch panel.

In order to achieve the above and other objectives, the present invention provides a touch panel. The touch panel comprises a substrate, a first conductive layer, an electrode, a first insulating transparent layer, a second insulating transparent layer, a second conductive layer and a metal layer. The first conductive layer is stacked on the substrate. The first conductive layer has a first sensing unit, a third sensing unit, and a first connection unit. The first connection unit is disposed between the first sensing unit and the third sensing unit. The first sensing unit is defined with a first region and a second region. The electrode is stacked on the first region of the first sensing unit. The first insulating transparent layer is stacked on the second region of the first sensing unit, the third sensing unit, and a portion of the electrode. The second insulating transparent layer is stacked on the first connection unit and the first insulating transparent layer. The second conductive layer is stacked on the second insulating transparent layer. The second conductive layer has a second sensing unit, a fourth sensing unit, and a second connection unit. The second connection unit is disposed between the second sensing unit and the fourth sensing unit. The metal layer is stacked on the electrode, at least a portion of the substrate, and at least a portion of the second sensing unit. A first transmission line is formed on the electrode and the substrate. A second transmission line is formed on the substrate and at least a portion of the second sensing unit.

In order to achieve the above and other objectives, the present invention provides a touch panel manufacturing method. The manufacturing method comprises the steps as follows. Step (a) which entails stacking a first conductive layer on a substrate. Step (b) which entails stacking an electrode on the first conductive layer. Step (c) which entails stacking a first insulating transparent layer on the electrode and the first conductive layer. Step (d) which entails performing exposure on the first insulating transparent layer from above and the first conductive layer from above with a first photomask having a first pattern group to thereby form the first pattern group at the first insulating transparent layer and the first conductive layer, the first pattern group comprising a first sensing pattern, a third sensing pattern, and a first connection pattern, wherein the first sensing pattern, the third sensing pattern, and the first connection pattern are arranged along a first axis. Step (e) which entails performing development and etching on the first insulating transparent layer and the first conductive layer to allow the electrode to be exposed from the first insulating transparent layer and form a first sensing unit, a third sensing unit, and a first connection unit at the first conductive layer. Step (f) which entails stacking a second insulating transparent layer on the electrode, the first sensing unit, and the first insulating transparent layer. Step (g) which entails stacking a second conductive layer on the second insulating transparent layer, the second conductive layer having a second sensing unit, a fourth sensing unit, and a second connection unit, wherein the second sensing unit, the fourth sensing unit, and the second connection unit are arranged along a second axis. Step (h) which entails stacking a metal layer on the electrode and the substrate to form a first transmission line and stacking the metal layer on at least a portion of the second sensing unit and the substrate to form a second transmission line.

BRIEF DESCRIPTION

Objectives, features, and advantages of the present invention are hereunder illustrated with specific embodiments in conjunction with the accompanying drawings, in which.

Figure 1:
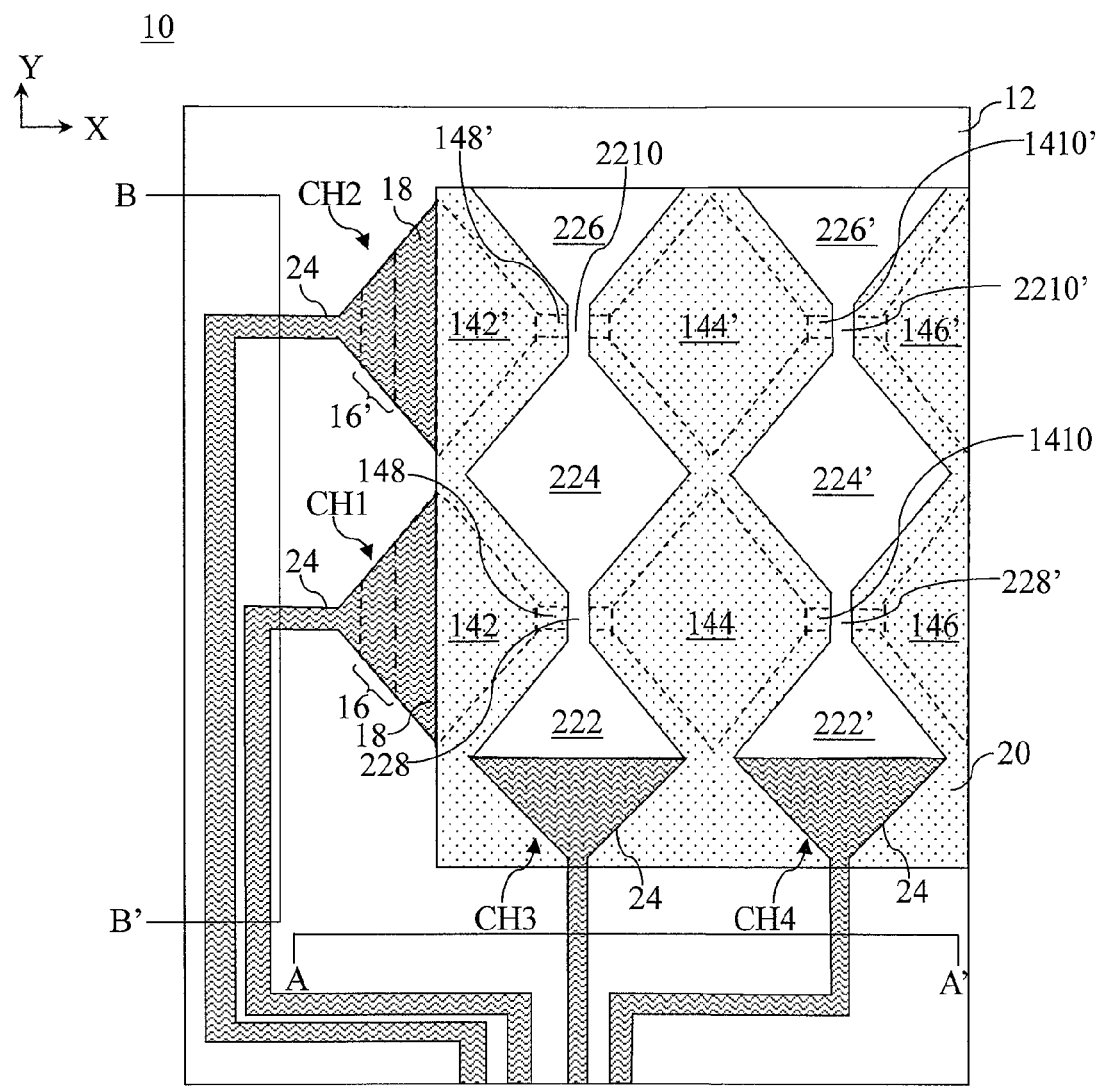
FIG. 1 is a top view of a touch panel according to an embodiment of the present invention.
Figure 3A:
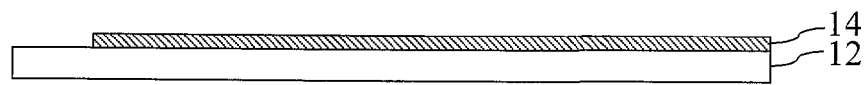
Figure 3B:
Figure 3C:
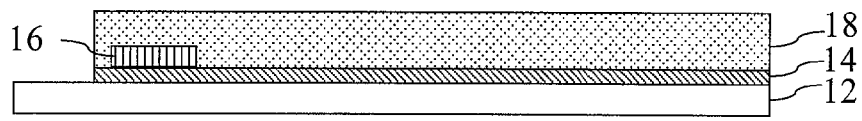
Figure 3D:
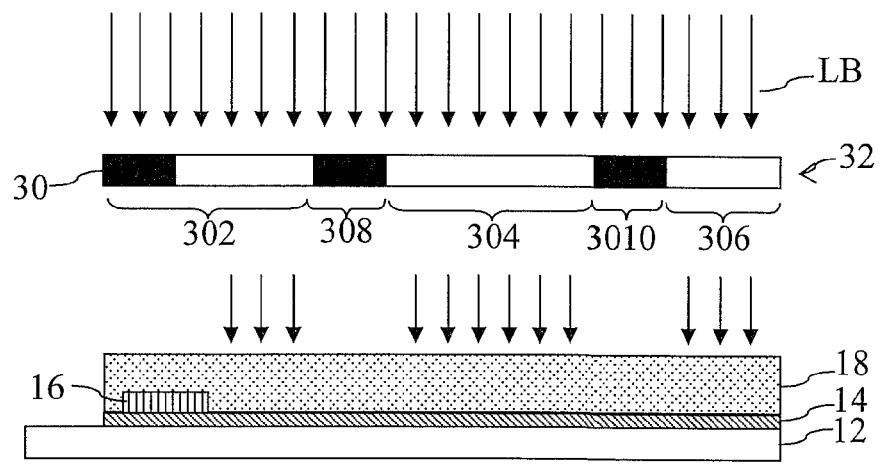
Figure 3E:
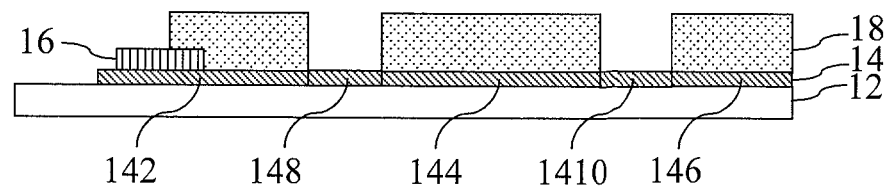
Figure 3F:
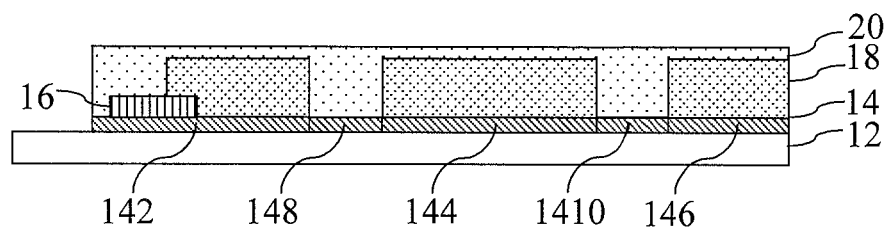
Figure 3G:
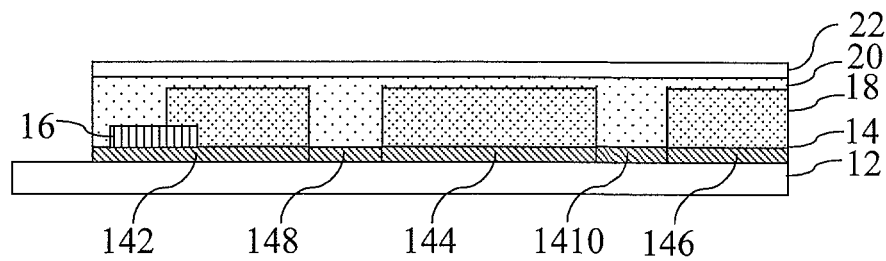
Figure 3H:
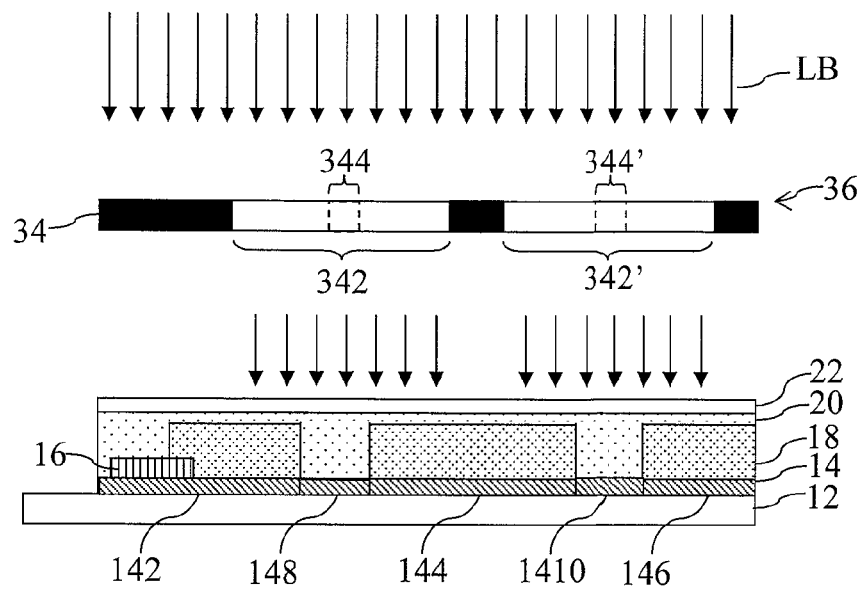
Figure 3I:
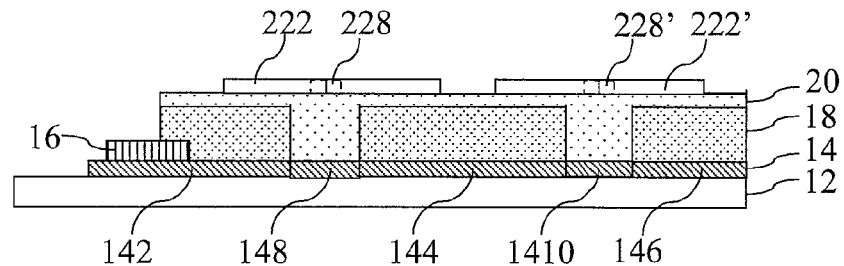
Figure 3J:
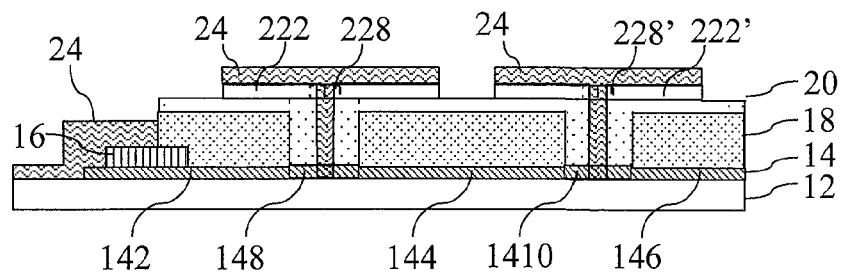
Figure 3K:
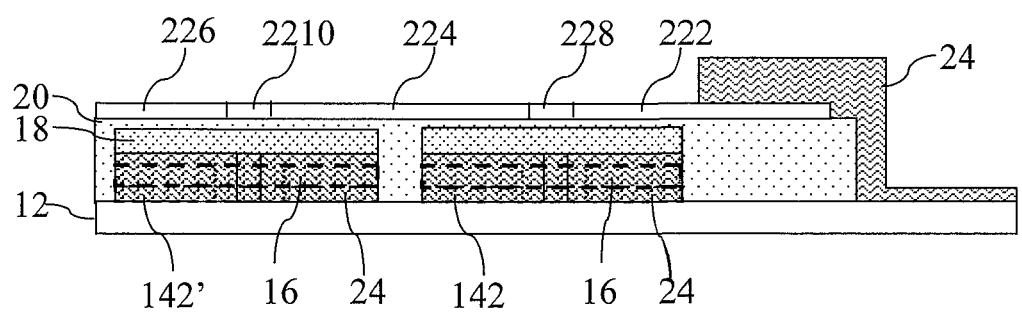
Figure 4:
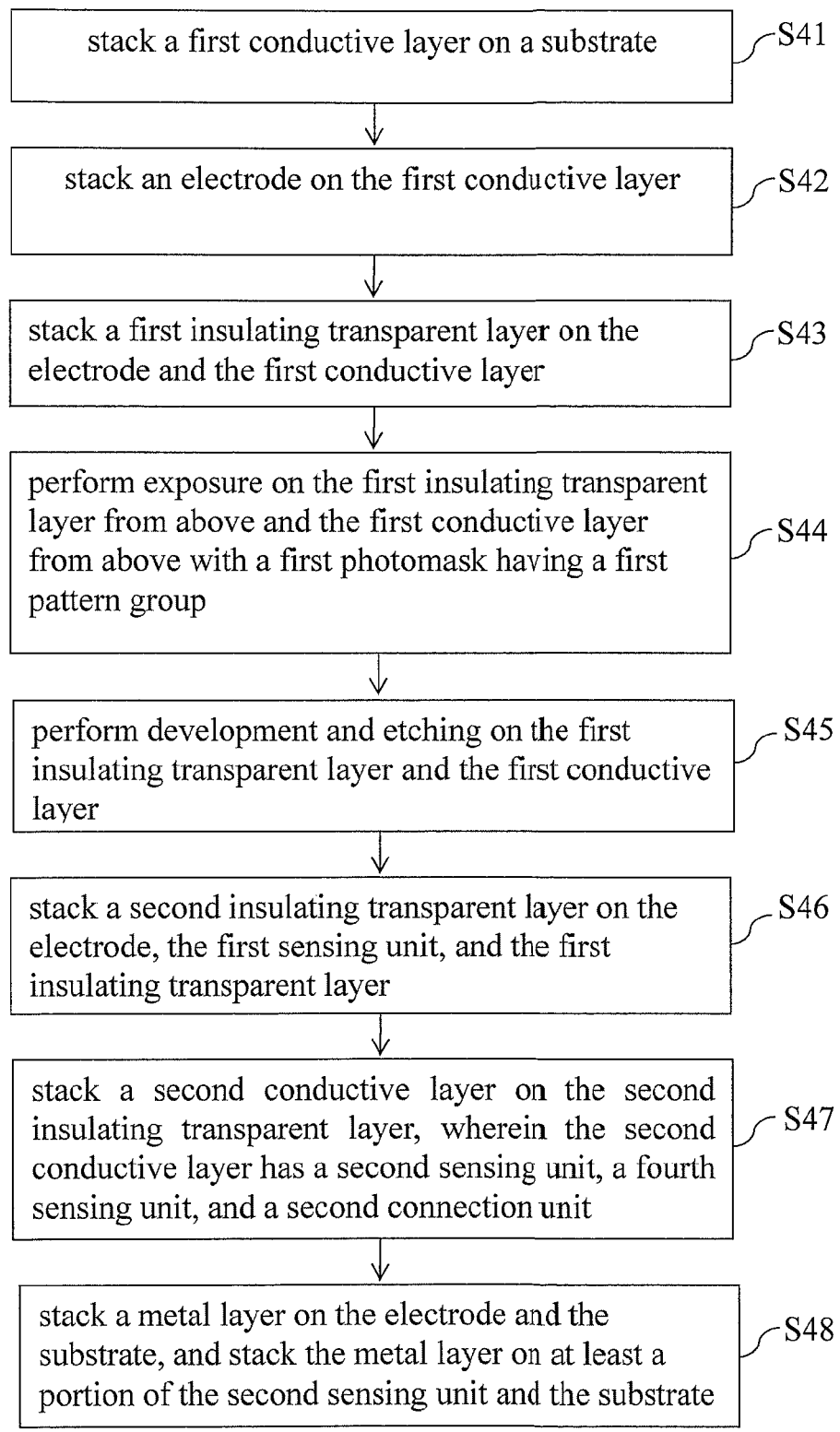

FIGS. 3*a* through 3*k* are schematic views of a manufacturing process of the touch panel shown in FIG. 1 according to an embodiment of the present invention; and FIG. 4 is a flow chart of a touch panel manufacturing method according to an embodiment of the present invention.

DETAILED DESCRIPTION

Referring to FIG. 1, there is shown a top view of a touch panel according to an embodiment of the present invention. As shown in FIG. 1, the touch panel 10 comprises a substrate 12, a first conductive layer (which comprises two first sensing units 142, 142', two third sensing units 144, 144', two fifth sensing units 146, 146', and four first connection units 148, 148', 1410, 1410'), two electrodes 16, 16', a first insulating transparent layer 18, a second insulating transparent layer 20, a second conductive layer (which comprises two second sensing units 222, 222', two fourth sensing units 224, 224', two sixth sensing units 226, 226', and four second connection units 228, 228', 2210, 2210') and a metal layer 24.

The substrate 12 is made of a flexible material or an inflexible material. For example, the substrate 12 is made of silicon dioxide, polyethylene, polypropylene, polyvinyl chloride, polycarbonate, polymethacrylate, and/or polyethylene terephthalate.

The first conductive layer is stacked on the substrate 12. The first conductive layer is made of a transparent conductive material. For example, the transparent conductive material comprises at least one selected from the group consisting of indium tin oxide, indium zinc oxide, cadmium tin oxide, aluminum zinc oxide, indium zinc tin oxide, zinc oxide, cadmium oxide, hafnium oxide, indium gallium zinc oxide, indium gallium zinc magnesium oxide, indium gallium oxide, indium gallium aluminum oxide, silver nanowires, grapheme, and metal mesh.

The first conductive layer comprises a first channel CH1 and a second channel CH2. The first channel CH1 comprises the first sensing unit 142, the third sensing unit 144, the fifth sensing unit 146, and two said first connection units 148, 1410. The first connection unit 148 is disposed between the first sensing unit 142 and the third sensing unit 144. The first connection unit 1410 is disposed between the third sensing unit 142 and the fifth sensing unit 146. The second channel CH2 comprises another said first sensing unit 142', another third sensing unit 144', another fifth sensing unit 146', and two other said first connection units 148', 1410'.

As the first channel CH1 comprises the same elements as the second channel CH2 does, the description below is exemplified only by the first channel CH1 for the sake of illustration. The description of the first channel CH1 is applicable to the second channel CH2.

In an embodiment of the first channel CH1, each of three said sensing units 142, 144, 146 is rhomboidal. In another embodiment, each of three said sensing units 142, 144, 146 is triangular, rectangular, and/or round. It is also feasible that the quantity of three said sensing unit 142, 144, 146 be changed to one, two, or plurality.

In an embodiment of the first channel CH1, the first sensing unit 142, the third sensing unit 144, the fifth sensing unit 146, and two said first connection units 148, 1410 are arranged along a first axis. In this embodiment, the first axis is the X axis.

The first sensing unit 142 is defined with a first region and a second region. In this embodiment, the first sensing unit 142 defines a portion of the left half of the rhomboid as the first region and defines the right half of the rhomboid as the second region. In this embodiment, the first region is trapezoidal for the sake of illustration, and the second region is triangular for the sake of illustration. In another embodiment, the shape of the first region and the shape of the second region are not limited to the present invention.

The electrode 16 is stacked on the first region of the first sensing unit 142.

The first insulating transparent layer 18 is stacked on the second region of the first sensing unit 142, the third sensing unit 144, the fifth sensing unit 146, and a portion of the electrode 16. The first insulating transparent layer 18 is made of a positive photoresist material and/or a negative photoresist material.

The second insulating transparent layer 20 is stacked on the first insulating transparent layer 18. The second insulating transparent layer 20 is made of a positive photoresist material and/or a negative photoresist material.

The second conductive layer is stacked on the second insulating transparent layer 20. The second conductive layer can be made of the same material as the first conductive layer 14 is.

The second conductive layer comprises a third channel CH3 and a fourth channel CH4. The third channel CH3 comprises the second sensing unit 222, the fourth sensing unit 224, the sixth sensing unit 226, and two said second connection units 228, 2210. The second connection unit 228 is disposed between the second sensing unit 222 and the fourth sensing unit 224. The second connection unit 2210 is disposed between the fourth sensing unit 224 and the sixth sensing unit 226. The fourth channel CH4 comprises another second sensing unit 222', another fourth sensing unit 224', another sixth sensing unit 226', and two second connection units 228', 2210'.

As the third channel CH3 comprises the same elements as the fourth channel CH4 does, the description below is exemplified only by the third channel CH3 for the sake of illustration. The description of the third channel CH3 is applicable to the fourth channel CH4.

In an embodiment of the third channel CH3, each of three said sensing units 222, 224, 226 is rhomboidal. In another embodiment, each of three said sensing units 222, 224, 226 is triangular, rectangular, and/or round. In this embodiment, the sensing units are in the number of three for the sake of illustration.

The second sensing unit 222, the fourth sensing unit 224, the sixth sensing unit 226, and two said second connection units 228, 2210 are arranged along a second axis. In this embodiment, the second axis is the Y axis.

The metal layer 24 is stacked on the electrode 16 and at least a portion of the substrate 12 to form a first transmission line. The metal layer 24 is stacked on the substrate 12 and at least a portion of the second sensing unit 222 to form a second transmission line.

Figure 2:
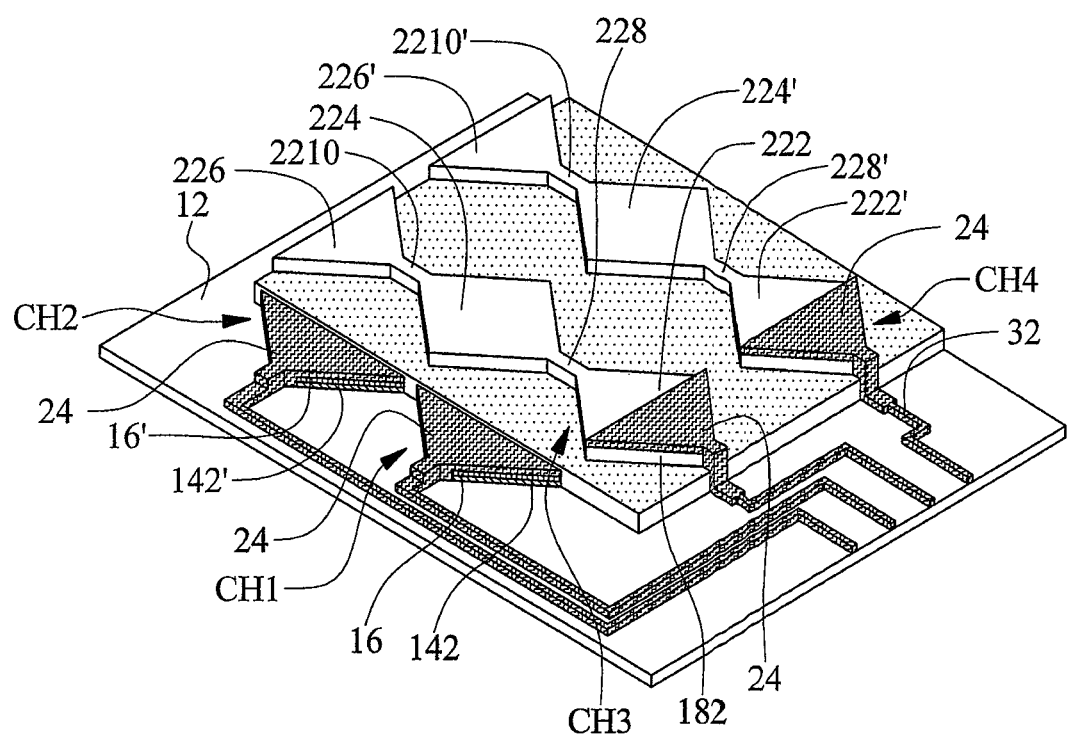
FIG. 2 is a perspective view of the touch panel shown in FIG. 1 according to the present invention.

Referring to FIG. 2, there is shown a perspective view of the touch panel shown in FIG. 1 according to the present invention.

Referring to FIG. 3a to FIG. 3k, there are shown schematic views of the process flow of the manufacturing of the touch panel shown in FIG. 1. FIG. 3a through FIG. 3j are cross-sectional views of the touch panel 10 taken along line A-A' of FIG. 1. FIG. 3k is a cross-sectional view of the touch panel 10 taken along line B-B' of FIG. 1.

Referring to FIG. 3a, a first conductive layer 14 is stacked on a substrate 12. In this embodiment, the first conductive layer 14 is made from silver nanowires.

Referring to FIG. 3b, an electrode 16 is stacked on the first conductive layer 14. The electrode 16 is stacked on the first conductive layer 14 by means of screen printing, for example. The electrode 16 is made of a material resistant to developers and/or etching solutions.

Referring to FIG. 3c, a first insulating transparent layer 18 is stacked on the electrode 16 and the first conductive layer 14. In this embodiment, the first insulating transparent layer 18 is made of a negative photoresist material for an illustrative purpose. The negative photoresist material is characterized in that, after the negative photoresist material has been irradiated with UV, the non-irradiated portion of the negative photoresist material is removed by a developer.

Referring to FIG. 3d, exposure is performed on the first insulating transparent layer 18 from above and the first conductive layer 14 from above with a first photomask 32 having a first pattern group 30. As shown in FIG. 3d, the first photomask 32 displays a first sensing pattern 302, a third sensing pattern 304, a fifth sensing pattern 306, and two first connection patterns 308, 3010. The patterns 302, 304, 306, 308, 3010 are arranged along the first axis. A light beam LB falls on the first photomask 32 (i.e., an exposure process) to form the first pattern group 30 at the first insulating transparent layer 18 and the first conductive layer 14.

Referring to FIG. 3e, the first insulating transparent layer 18 and the first conductive layer 14 undergo development to allow the electrode 16 to be exposed from the first insulating transparent layer 18 and form the first sensing unit 142, the third sensing unit 144, the fifth sensing unit 146, and the first connection units 148, 148' at the first conductive layer 14.

In this embodiment, the first conductive layer 14 is made from silver nanowires. The silver nanowires undergo the development process and thus are etched to form the first sensing unit 142, the third sensing unit 144, the fifth sensing unit 146, and two said first connection units 148, 148'. The undeveloped portion of the first insulating transparent layer 18 is kept and thus does not undergo a conventional stripping process.

Referring to FIG. 3f, a second insulating transparent layer 20 is stacked on the electrode 16, the first sensing unit 142, and the first insulating transparent layer 18. In this embodiment, the second insulating transparent layer 18 is made of a negative photoresist material for an illustrative purpose.

Referring to FIG. 3g, a second conductive layer 22 is stacked on the second insulating transparent layer 20. In this embodiment, the second conductive layer 22 is made from silver nanowires.

Referring to FIG. 3h, exposure is performed on the second conductive layer 22 from above with a second photomask 36 having a second pattern group 34. As shown in FIG. 3h, the second photomask 36 comprises a second sensing pattern 342, another second sensing pattern 342', and two second connection patterns 344, 344'.

Referring to FIG. 3i, the second conductive layer 22 undergoes the development process to form two said second sensing units 222, 222' and two said second connection units 228, 228'.

Referring to FIG. 3j, a metal layer 24 is stacked on the electrode 16 and the substrate 12 so as to form the first transmission line, and the metal layer 24 is stacked on at least a portion of the second sensing unit 222 and the substrate 12 so as to form the second transmission line.

Referring to FIG. 4, there is shown a flow chart of a touch panel manufacturing method according to an embodiment of the present invention. The process flow of the touch panel manufacturing method comprises the following steps:

Step S41: stacking a first conductive layer on a substrate.
Step S42: stacking an electrode on the first conductive layer.
Step S43: stacking a first insulating transparent layer on the electrode and the first conductive layer.

Step S44: performing exposure on the first insulating transparent layer from above and the first conductive layer from above with a first photomask having a first pattern group to form the first pattern group at the first insulating transparent layer and the first conductive layer.

Step S45: performing development and etching on the first insulating transparent layer and the first conductive layer to allow the electrode to be exposed from the first insulating transparent layer and form a first sensing unit, a third sensing unit, and a first connection unit at the first conductive layer. The undeveloped portion of the first conductive layer is kept and thus does not undergo a conventional stripping process.

Step S46: stacking a second insulating transparent layer on the electrode, the first sensing unit, and the first insulating transparent layer.

Step S47: stacking a second conductive layer on the second insulating transparent layer, wherein the second conductive layer has a second sensing unit, a fourth sensing unit, and a second connection unit. In step S43 through step S45, the way of forming the first sensing unit, the third sensing unit, and the first connection unit at the first conductive layer is applicable to the second conductive layer.

For instance, exposure is performed on the second conductive layer from above with a second photomask having a second pattern group, so as to form the second pattern group at the second conductive layer. The second pattern group comprises a second sensing pattern, a fourth sensing pattern, and a second connection pattern. The second sensing pattern, the fourth sensing pattern, and the second connection pattern are arranged along the second axis. Depending on the material of which the second insulating transparent layer is made, the second insulating transparent layer undergoes two different processes to form the second sensing unit, the fourth sensing unit, and the second connection unit at the second conductive layer.

Step S48: stacking a metal layer on the electrode and the substrate to form a first transmission line, and stacking the metal layer on at least a portion of the second sensing unit and the substrate to form a second transmission line.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A touch panel, comprising:
   a substrate;
   a first conductive layer stacked on the substrate, the first conductive layer having a first sensing unit, a third sensing unit, and a first connection unit, wherein the first connection unit is disposed between the first sensing unit and the third sensing unit, and the first sensing unit is defined with a first region and a second region;
   an electrode stacked on the first region of the first sensing unit;
   a first insulating transparent layer stacked on the second region of the first sensing unit, the third sensing unit, and a portion of the electrode;
   a second insulating transparent layer stacked on the first connection unit and the first insulating transparent layer;
   a second conductive layer stacked on the second insulating transparent layer, the second conductive layer having a second sensing unit, a fourth sensing unit, and a second connection unit, wherein the second connection unit is disposed between the second sensing unit and the fourth sensing unit; and a metal layer stacked on the electrode and at least portion of the substrate to form a first transmission line and stacked on the substrate and at least a portion of the second sensing unit to form a second transmission line.

2. The touch panel of claim 1, wherein the first sensing unit and the electrode are rhomboidal, triangular, rectangular, and/or round.

3. The touch panel of claim 1, wherein the first sensing unit, the third sensing unit, and the first connection unit are arranged along a first axis, wherein the second sensing unit, the fourth sensing unit, and the second connection unit are arranged along a second axis.

4. The touch panel of claim 1, wherein the first conductive layer and the second conductive layer are each made of a transparent conductive material comprising at least one selected from the group consisting of indium tin oxide, indium zinc oxide, cadmium tin oxide, aluminum zinc oxide, indium zinc tin oxide, zinc oxide, cadmium oxide, hafnium oxide, indium gallium zinc oxide, indium gallium zinc magnesium oxide, indium gallium oxide, indium gallium aluminum oxide, silver nanowires, graphene and metal mesh.

5. The touch panel of claim 1, wherein the substrate is made of at least one of silicon dioxide, polyethylene, polypropylene, polyvinyl chloride, polycarbonate, polymethacrylate, and polyethylene terephthalate.

6. The touch panel of claim 1, wherein the substrate is made of a flexible material.

7. The touch panel of claim 1, wherein the first insulating transparent layer and the second insulating transparent layer are each made of at least one of a positive photoresist material and a negative photoresist material.

8. A touch panel manufacturing method, comprising the steps of:
(a) stacking a first conductive layer on a substrate;
(b) stacking an electrode on the first conductive layer;
(c) stacking a first insulating transparent layer on the electrode and the first conductive layer;
(d) performing exposure on the first insulating transparent layer from above and the first conductive layer from above with a first photomask having a first pattern group to thereby form the first pattern group at the first insulating transparent layer and the first conductive layer, the first pattern group comprising a first sensing pattern, a third sensing pattern, and a first connection pattern, wherein the first sensing pattern, the third sensing pattern, and the first connection pattern are arranged along a first axis;
(e) performing development and etching on the first insulating transparent layer and the first conductive layer to allow the electrode to be exposed from the first insulating transparent layer and form a first sensing unit, a third sensing unit, and a first connection unit at the first conductive layer;
(f) stacking a second insulating transparent layer on the electrode, the first sensing unit, and the first insulating transparent layer;
(g) stacking a second conductive layer on the second insulating transparent layer, the second conductive layer having a second sensing unit, a fourth sensing unit, and a second connection unit, wherein the second sensing unit, the fourth sensing unit, and the second connection unit are arranged along a second axis; and
(h) stacking a metal layer on the electrode and the substrate to form a first transmission line and stacking the metal layer on at least a portion of the second sensing unit and the substrate to form a second transmission line.

9. The touch panel of claim 8, wherein step (e) further comprises etching the first conductive layer upon completion of development of the first insulating transparent layer and the first conductive layer to form the first sensing unit, the third sensing unit, and the first connection unit at the first conductive layer.

10. The touch panel of claim 8, wherein step (g) is followed by step (h) which further entails performing exposure on the second conductive layer from above with a second photomask having a second pattern group to form the second pattern group at the second conductive layer, the second pattern group comprising a second sensing pattern, a fourth sensing pattern, and a second connection pattern, wherein the second sensing pattern, the fourth sensing pattern, and the second connection pattern are arranged along the second axis.

11. The touch panel of claim 10, wherein step (h) is followed by step (i) which entails performing development on the second insulating transparent layer to form the second sensing unit, the fourth sensing unit, and the second connection unit at the second conductive layer.

12. The touch panel of claim 10, wherein step (h) is followed by step (j) which entails performing development and etching on the second insulating transparent layer to form the second sensing unit, the fourth sensing unit, and the second connection unit at the second conductive layer.

* * * * *